(12) United States Patent
Nagai et al.

(10) Patent No.: US 11,305,677 B2
(45) Date of Patent: Apr. 19, 2022

(54) VEHICLE SEAT DEVICE

(71) Applicant: Toyota Jidosha Kabushiki Kaisha, Toyota (JP)

(72) Inventors: Tetsuya Nagai, Okazaki (JP); Kohshi Katoh, Toyota (JP); Koki Kunugi, Fuji (JP); Ayumu Takeda, Susono (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/146,815

(22) Filed: Jan. 12, 2021

(65) Prior Publication Data

US 2021/0221267 A1 Jul. 22, 2021

(30) Foreign Application Priority Data

Jan. 17, 2020 (JP) .............................. JP2020-006326

(51) Int. Cl.
*B60N 2/50* (2006.01)
*B60N 2/68* (2006.01)
*B60N 2/10* (2006.01)
*B60N 2/54* (2006.01)

(52) U.S. Cl.
CPC ................ *B60N 2/68* (2013.01); *B60N 2/10* (2013.01); *B60N 2/503* (2013.01); *B60N 2/54* (2013.01)

(58) Field of Classification Search
CPC .......... B60N 2/504; A47C 3/026; A47C 7/282
See application file for complete search history.

(56) References Cited

U.S. PATENT DOCUMENTS

| | | | |
|---|---|---|---|
| 6,746,081 B1 | 6/2004 | Klingler | |
| 2008/0088158 A1* | 4/2008 | Yokota | B60N 2/888 297/216.12 |
| 2015/0367756 A1* | 12/2015 | Katoh | B60N 2/66 297/285 |
| 2018/0072187 A1* | 3/2018 | Katoh | B60N 2/7076 |
| 2019/0255976 A1* | 8/2019 | Katoh | B60N 2/544 |
| 2021/0061140 A1* | 3/2021 | Nagai | B60N 2/39 |
| 2021/0086666 A1* | 3/2021 | Nagai | B60N 2/64 |
| 2021/0086669 A1* | 3/2021 | Nagai | B60N 2/68 |
| 2021/0237630 A1* | 8/2021 | Muck | B60N 2/028 |

FOREIGN PATENT DOCUMENTS

| | | | | |
|---|---|---|---|---|
| EP | 3632741 A1 * | 4/2020 | | B60N 2/6673 |
| JP | 2019-142405 A | 8/2019 | | |
| WO | WO-2009085887 A2 * | 7/2009 | | B60N 2/504 |
| WO | WO-2015193854 A1 * | 12/2015 | | B60N 2/0248 |

* cited by examiner

*Primary Examiner* — Timothy J Brindley
(74) *Attorney, Agent, or Firm* — Dinsmore & Shohl LLP

(57) ABSTRACT

A vehicle seat device includes an SB main frame that is joined to a seat cushion via a reclining shaft; an SB subframe that is swingable with respect to the SB main frame at least about a roll axis; a backrest that is installed on the SB subframe; and a lower support wire and an upper support wire that limit rearward movement of the SB subframe and allow movement of the SB subframe about the roll axis. A straight line connecting between the front end and the rear end of the lower support wire is inclined with respect to a normal line so as to rise toward the front, the normal line being normal to a straight line connecting between an upper end of the SB main frame and the reclining shaft.

6 Claims, 14 Drawing Sheets

VEHICLE SEAT DEVICE

CROSS REFERENCE TO RELATED APPLICATION

This application claims priority to Japanese Patent Application No. 2020-006326 filed on Jan. 17, 2020, which is incorporated herein by reference in its entirety including the specification, claims, drawings, and abstract.

TECHNICAL FIELD

The present specification discloses a vehicle seat device including a backrest configured to support a back portion of a seat occupant, the backrest being swingable at least about a roll axis with respect to a seat back main frame that is in an upright position in a vehicle cabin.

BACKGROUND

There have been heretofore known vehicle seat devices including a backrest configured to support a back portion of a seat occupant, the backrest being made swingable with respect to a seat back main frame (hereinafter the term "seat back" is abbreviated as "SB") in order to increase the ease of keeping the posture of the seat occupant.

For example, JP 2019-142405 A discloses a vehicle seat device including a backrest that is held in a suspended manner from an SB main frame by wires. The backrest has an SB subframe installed thereon, and the SB subframe is swingable together with the backrest with respect to the SB main frame. In JP 2019-142405 A, the SB main frame and the SB subframe are joined together via plate springs that are deformable toward the right and toward the left, and the plate springs limit rearward movement of the SB subframe with respect to the SB main frame. Because the vehicle seat device disclosed in JP 2019-142405 A limits rearward movement of the SB subframe and, in turn, rearward movement of the backrest, the posture of a seat occupant is stabilized to some extent.

However, conventional vehicle seat devices have a drawback in that the head of a seat occupant easily shakes back and forth or up and down when a large rearward load is applied to the SB subframe, for example, upon sudden acceleration of the vehicle or during off-road driving. Such back-and-forth or up-and-down shaking of the head adversely affects the seat occupant's visibility of the front environment. While causes of large shaking of the head about a pitch axis are not clearly identified, one possible cause is that a reaction force generated in response to a rearward load applied to the SB subframe acts from the SB subframe in a direction that does not match a direction in which shaking of the head is suppressed.

In consideration of the above, the present specification discloses a vehicle seat device that can reduce shaking of the head of a seat occupant.

SUMMARY

The present specification discloses a vehicle seat device comprising an SB main frame that is in an upright position in a cabin, the SB main frame being joined to a seat cushion via a reclining shaft; an SB subframe that is swingable with respect to the SB main frame at least about a roll axis; a backrest configured to support a back portion of a vehicle occupant, the backrest being installed on the SB subframe and being swingable together with the SB subframe; and a plurality of support members each having a front end joined to the SB main frame and a rear end joined to the SB subframe and having a variable joint-to-joint distance to limit rearward movement of the SB subframe and allow movement of the SB subframe about the roll axis, wherein the plurality of support members include a lower support member disposed in a lower half area of the SB subframe and an upper support member disposed in an upper half area of the SB subframe, and wherein a straight line connecting between the front end and the rear end of the lower support member is inclined with respect to a reference normal line so as to rise toward the front, the reference normal line being normal to a straight line connecting between an upper end of the SB main frame and the reclining shaft.

With this structure, upon application of a rearward force to the SB subframe, a reaction force that rises toward the front from the SB subframe acts near the seat occupant's waist. As a result, the seat occupant's back spontaneously bends backward, and then, as downward and forward movement of the head is limited, movement of the head is reduced.

In this structure, a straight line connecting between the front end and the rear end of the upper support member may be inclined with respect to the reference normal line so as to be lower toward the front.

With this structure, movement of the head in the right/left direction can be reduced.

Also, the upper support member may be a non-linear elastic body, wherein the non-linear elastic body exhibits no tension in an initial phase after application of a rearward load that causes the SB subframe to move rearward with respect to the SB main frame, and wherein the non-linear elastic body increases tension after the initial phase is over.

With this structure, movement of the head in the up/down direction can be suppressed more effectively.

Also, the straight line connecting between the front end and the rear end of the lower support member may be inclined with respect to the reference normal line at an angle of 25 degrees to 35 degrees.

With this structure, movement of the head about the pitch axis can be suppressed more effectively.

Also, the upper support member and the lower support member may be selected from the group consisting of elongated flexible members, springs, and dampers.

The use of common components such as elongated flexible members, springs, or dampers can reduce the cost of the vehicle seat device.

The vehicle seat device may further comprise a relay disk fixed to a rear side of the backrest; and a plurality of suspensions each strung between the relay disk and the SB main frame, the plurality of suspensions being configured to hold the backrest in a suspended manner from the SB main frame.

With this structure, the SB subframe can be made swingable with respect to the SB main frame about the roll axis, by a simple and lightweight structure.

By employing a vehicle seat device disclosed in the present specification, shaking of the head of a seat occupant can be reduced.

BRIEF DESCRIPTION OF DRAWINGS

Embodiments of the present disclosure will be described based on the following figures, wherein.

DESCRIPTION OF EMBODIMENTS

Figure 1:
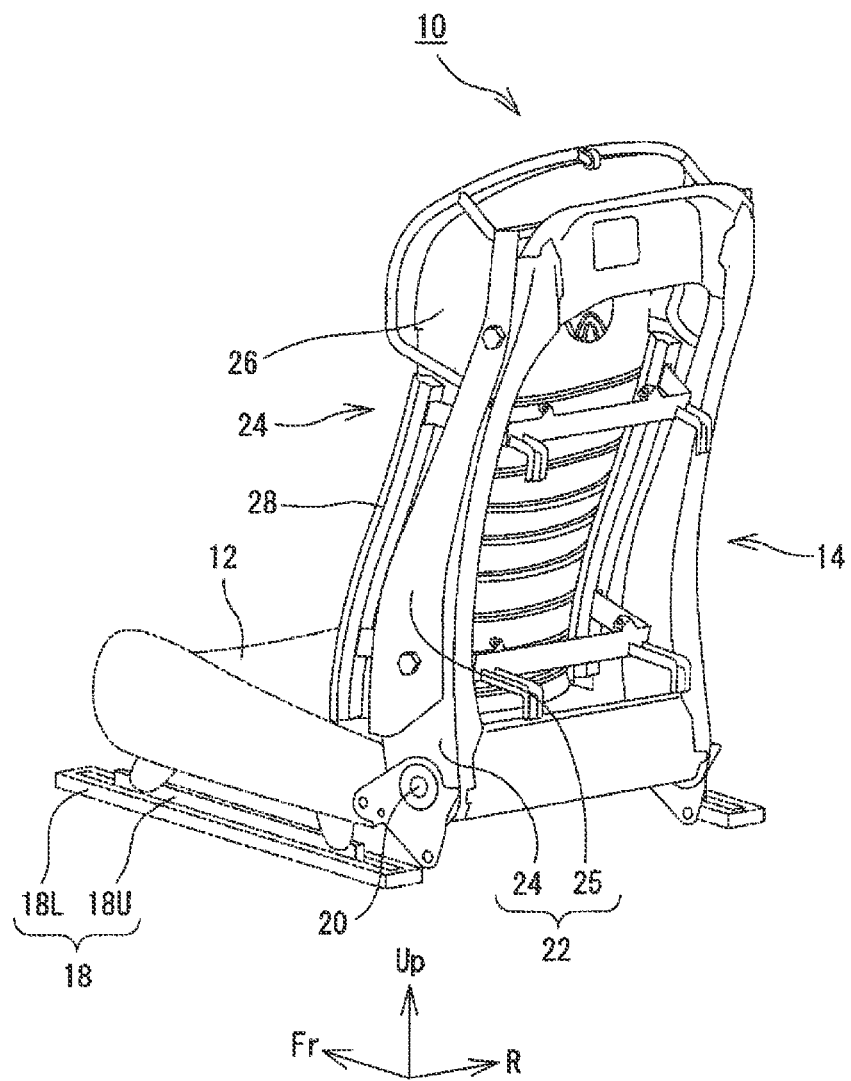
FIG. 1 is a perspective view of a vehicle seat device as viewed from diagonally behind.

A structure of a vehicle seat device 10 will be described below with reference to the accompanying drawings. FIG. 1 is a perspective view of the vehicle seat device 10 as viewed from diagonally behind. In the following description, unless otherwise specified, the terms "up/down", "front/rear", and "right/left" represent directions as viewed from a vehicle occupant who is seated on the vehicle seat device 10 (hereinafter referred to as "seat occupant"). Arrows "Fr", "Up", and "R" in the drawings respectively indicate directions toward the front, upward, and toward the right. Further, in the present specification, the term "seat back" is abbreviated as "SB" where appropriate.

The vehicle seat device 10 is mounted in a vehicle and is used as, for example, the driver's seat or the front passenger's seat. The vehicle seat device 10 broadly includes a seat cushion 12 that supports the buttocks of a seat occupant and a seat back 14 that supports the upper half of the occupant's body. As the seat cushion 12 can be constructed using conventional known techniques, its structure is not described in detail here. FIG. 1 illustrates only a general shape of the seat cushion 12.

Slide rails 18 are installed on the floor of a cabin of the vehicle. The slide rails 18 include lower rails 18L that are fixed to the floor of the cabin and extend in the front/rear direction, and upper rails 18U that are slidable along the lower rails 18L. The seat cushion 12 has four corners that are joined to the upper rails 18U. As such, the vehicle seat device 10 is slidable in the front/rear direction.

Figure 2:
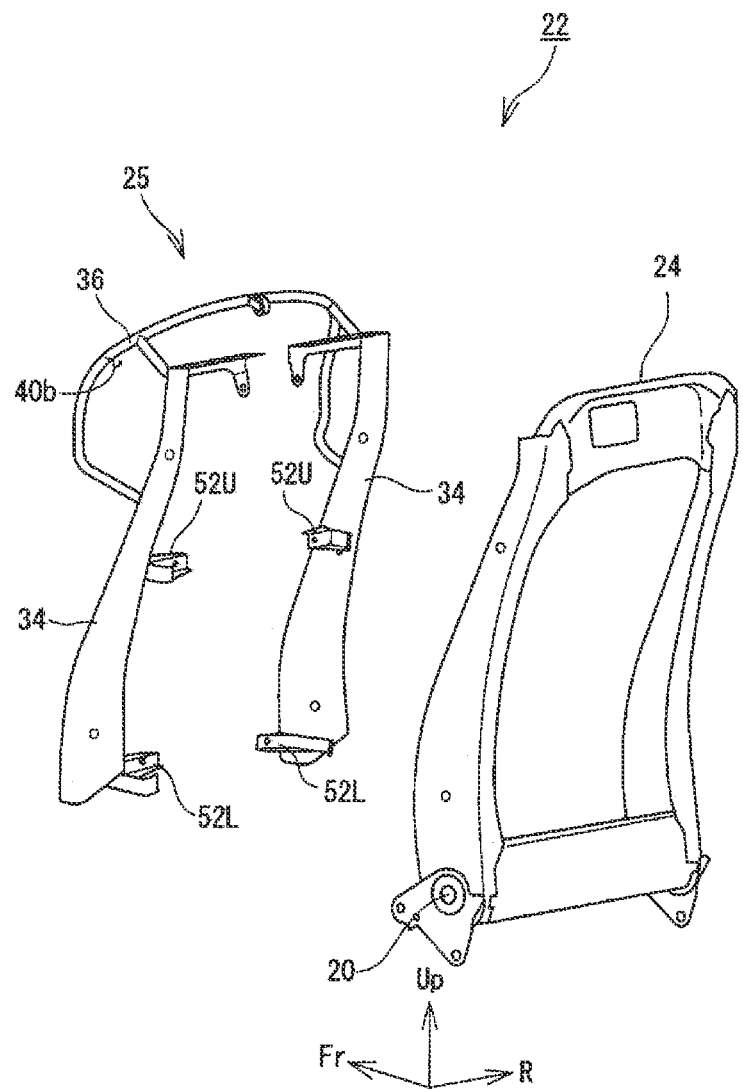
FIG. 2 is an exploded perspective view of an SB main frame.
Figure 3:
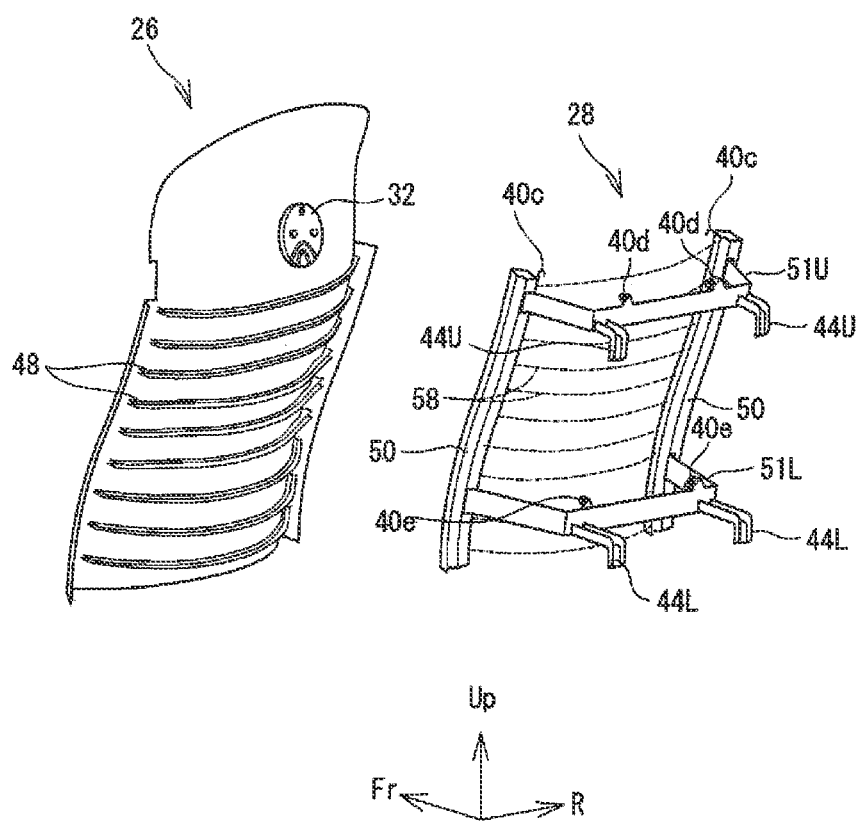
FIG. 3 is an exploded perspective view of an SB subframe and a backrest.

The seat back 14 broadly includes an SB main frame 22, an SB subframe 28, and a backrest 26. FIG. 2 is an exploded perspective view of the SB main frame 22, and FIG. 3 is an exploded perspective view of the SB subframe 28 and the backrest 26. The SB main frame 22 is a frame member that is in an upright position in the cabin, and includes a main frame 24, and an intermediate frame 25 that is attached to the main frame 24. As illustrated in FIG. 2, the main frame 24 includes four frame members that are located up and down and right and left and that are joined together; as such, the main frame 24 has a substantially rectangular hollow shape as viewed from the front. A reclining shaft 20 that extends in the right/left direction is set near a lower end of the main frame 24. The SB main frame 22 including the main frame 24 is swingably joined to the seat cushion 12 via the reclining shaft 20. Configuring the SB main frame 22 to swing about the reclining shaft 20 enables the entire seat back 14 to swing (in other words, recline) with respect to the seat cushion 12.

The intermediate frame 25 includes a pair of side frames 34 that extend in the up/down direction and a support pipe 36 that extends from the pair of side frames 34. Each of the side frames 34 is placed over an outer surface of the main frame 24 and fastened to the main frame 24 with bolts. Upper front restricting brackets 52U and lower front restricting brackets 52L (hereinafter referred to as "front restricting bracket 52" where distinguishing between upper and lower is of no importance) are attached to front ends of the side frames 34. A front end of each of upper support wires 66U is fixed to a corresponding one of the upper front restricting brackets 52U, and a front end of each of lower support wires 66L is fixed to a corresponding one of the lower front restricting brackets 52L, which will be described below. The upper support wires 66U and the lower support wires 66L are referred to as "support wire 66" where distinguishing between upper and lower is of no importance.

Next, the backrest 26 and the SB subframe 28 will be described below with reference to FIG. 3. The backrest 26 is a thin plate configured to support a back portion of a seat occupant. The backrest 26 is held in a suspended manner from the intermediate frame 25 of the SB main frame 22 and is swingable with respect to the SB main frame 22. The SB subframe 28 is installed behind the backrest 26 and swingable together with the backrest 26 with respect to the intermediate frame 25 and, in turn, the SB main frame 22.

More specifically, the backrest 26 is a member configured to support a back portion of a seat occupant and is smoothly curved to conform to the shape of the back of a human. A relay disk 32 is secured to a portion that is on the rear side of the backrest 26 and is at a center in the right/left direction. The relay disk 32 is disposed at a position that is above a center in the height direction of the backrest 26. The relay disk 32 is a disk member having a diameter dimension that is significantly greater than its axial dimension. The relay disk 32 has grooves and pulleys for receiving wires, which will be described below. A plurality of wire guides 48 are disposed at intervals in the up/down direction on the rear side of the backrest 26 and below the relay disk 32. The wire guides 48 guide placement positions of lateral wires 58, which will be described below, and are composed of ribs that project from the rear side of the backrest 26.

The SB subframe 28 is a frame member that is installed on the rear side of the backrest 26. The SB subframe 28 includes a pair of vertical frames 50, an upper lateral frame 51U and a lower lateral frame 51L (hereinafter referred to as "lateral frame 51" where distinguishing between upper and lower is of no importance), and a plurality of the lateral wires 58. The vertical frames 50 are frame members that extend in the up/down direction and are installed on both right and left ends of the backrest 26. The lateral frames 51 connect between the pair of vertical frames 50.

The lateral frames 51 project rearward of the vertical frames 50, or, in other words, toward the SB main frame 22 so as to have a substantially rectangular U-shape as viewed from the top. A pair of upper rear restricting brackets 44U and a pair of fourth engagement portions 40d are secured to the upper lateral frame 51U. A pair of lower rear restricting brackets 44L (hereinafter referred to as "rear restricting brackets 44" where distinguishing between upper and lower is of no importance) and a pair of fifth engagement portions 40e are secured to the lower lateral frame 51L.

The fourth engagement portions 40d and the fifth engagement portions 40e are portions with which ends of lower wires 64 are engaged, which will be described below. The rear restricting brackets 44 are portions to which rear ends of the support wires 66 are fixed, which will be described below. The lateral wires 58 are strung between the pair of vertical frames 50. The lateral wires 58 support the backrest 26 from the rear and receive a load from a seat occupant.

Figure 4:
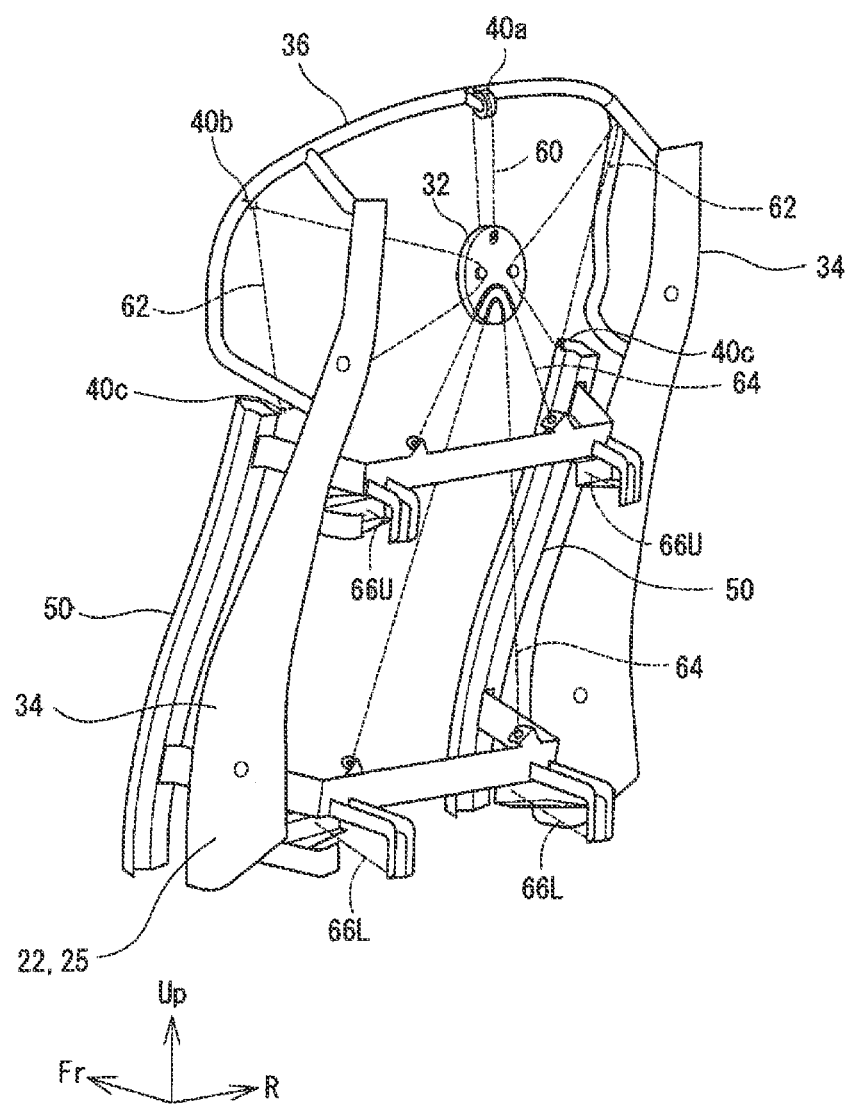
FIG. 4 illustrates a state in which wires are strung.
Figure 5:
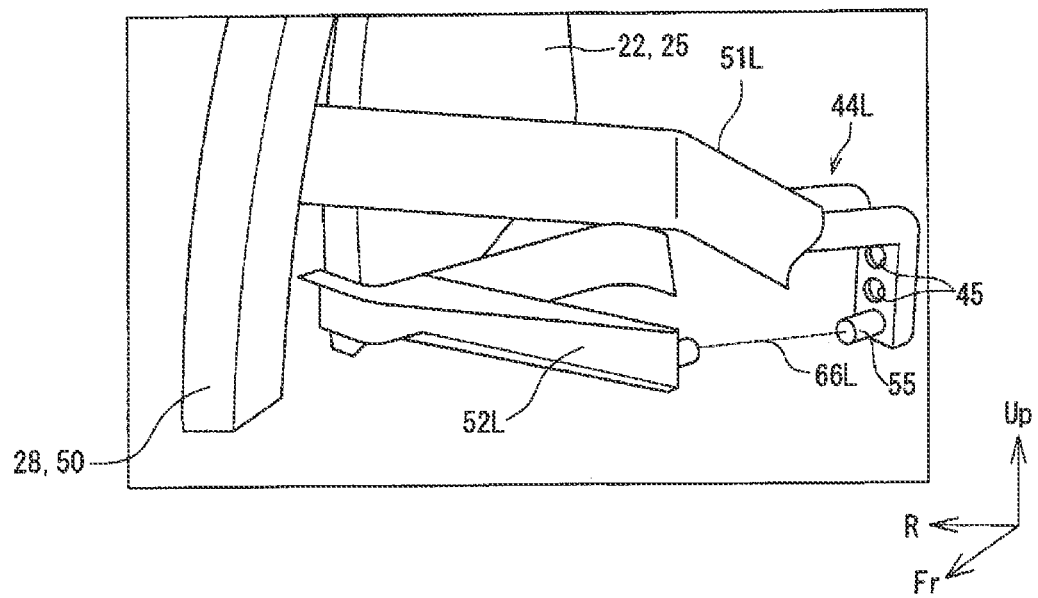
FIG. 5 is a perspective view of a structure around a lower support wire.

Referring to FIGS. 4 and 5, the following description will describe a manner in which various types of wires that support the backrest 26 or limit the position of the backrest 26 are strung. FIG. 4 illustrates a state in which wires are strung. FIG. 5 is a perspective view of a structure around a lower support wire 66L. In FIG. 4, the main frame 24, the backrest 26, and the lateral wires 58 are not illustrated.

As can be clearly seen from FIG. 4, one upper wire 60, a symmetric pair of right and left wires 62, and two of the lower wires 64 radially extend from the relay disk 32. These wires 60, 62, and 64 serve as suspensions configured to swingably hold the backrest 26 with respect to the SB main frame 22 in a suspended manner. The upper wire 60 runs between the relay disk 32 and a first engagement portion 40a located above the relay disk 32. The first engagement portion 40a is secured to the support pipe 36 at its center in the right/left direction and is located above the relay disk 32. The upper wire 60 is in a shape resembling a closed loop that extends from the relay disk 32 through the first engagement portion 40a of the support pipe 36 and again returns to the relay disk 32.

The support pipe 36 to which the first engagement portion 40a is secured is a portion of the intermediate frame 25; that is, a portion of the SB main frame 22. Holding the backrest 26 in a suspended manner from this support pipe 36 makes the backrest 26 swingable with respect to the SB main frame 22.

Each of the right and left wires 62 runs in the form of a closed loop having a substantially triangular shape that passes through the relay disk 32, a second engagement portion 40b, and a third engagement portion 40c. The second engagement portion 40b is secured to the support pipe 36 at a portion that is located either rightward or leftward of the relay disk 32, and upward and frontward of the relay disk 32. The third engagement portion 40c is secured to an upper end of the vertical frame 50. As the two right and left wires 62 are symmetric about the vertical centerline, the backrest 26 is automatically positioned at a neutral position where the two right and left wires 62 have tension in balance, or, in other words, at a position where the vertical centerline of the backrest 26 matches the vertical centerline of the SB main frame 22.

Each of the lower wires 64 is a non-loop wire that makes a U-turn at the relay disk 32 to extend downward so that both ends of the wire are located below the relay disk 32. Both ends of each of the lower wires 64 are fixed to either the pair of fourth engagement portions 40d or the pair of fifth engagement portions 40e that are disposed on the lateral frame 51.

As described above, the positions of the relay disk 32 and the backrest 26, to which the relay disk 32 is secured, with respect to the intermediate frame 25 (in turn, the SB main frame 22) are restricted by the wires 60, 62, and 64. However, this restriction is not rigid. As the wires 60, 62, and 64 moderately deform or tilt, the backrest 26 and the SB subframe 28, which is installed on the backrest 26, can swing about the relay disk 32 in a direction about an axis that extends in the front/rear direction, or, in other words, about the roll axis with respect to the SB main frame 22.

The position of the backrest 26 in the front/rear direction is limited by four support wires 66. A front end of each of the support wires 66 is secured to a corresponding one of the front restricting brackets 52, and a rear end of each of the support wires 66 is secured to a corresponding one of the rear restricting brackets 44. The support wires 66 limit rearward movement of the SB subframe 28 and allow movement of the SB subframe 28 about the roll axis, and serve as support members each having a variable joint-to-joint distance (in other words, distance between the front restricting bracket 52 and the rear restricting bracket 44).

As illustrated in FIG. 5, and as described above, the lower rear restricting bracket 44L is secured to the lower lateral frame 51L of the SB subframe 28, and stays at the same position with respect to the SB subframe 28. The lower front restricting bracket 52L is disposed frontward of the lower rear restricting bracket 44L. The lower front restricting bracket 52L is secured to the intermediate frame 25, and stays at the same position with respect to the SB main frame 22. The lower support wire 66L, which is strung between the lower front restricting bracket 52L and the lower rear restricting bracket 44L that are disposed in this manner, limits rearward movement of the backrest 26 and the SB subframe 28. Although FIG. 5 illustrates, by way of example, one of the lower front restricting brackets 52L and one of the lower rear restricting brackets 44L, the upper front restricting brackets 52U and the upper rear restricting brackets 44U also have similar structures.

With the vehicle seat device 10 configured as described above, the backrest 26 can swing about the roll axis with respect to the SB main frame 22. This structure stabilizes the posture of the head of a seat occupant, because shaking that occurs in the right/left direction as the vehicle is driven can be absorbed by the movement of the torso, rather than the head. Additionally, because the backrest 26 on which the occupant rests his/her back is supported by a plurality of wires, comfortable cushion properties can be obtained without a thick cushion member (such as a urethane sheet), and the vehicle seat device 10 can have a reduced weight.

During the driving of the vehicle, the seat occupant receives not only a force acting in the right/left direction, but also a rearward force. A rearward force is applied to the seat occupant, for example, upon sudden acceleration or when the vehicle is driven over an uneven spot during off-road driving. At this time, the head of a seat occupant who sits on a conventional vehicle seat device as disclosed in JP 2019-142405 A shakes relatively largely in a direction about an axis that extends in the right/left direction, or, in other words, about the pitch axis. More specifically, when a rearward force is applied, the head of a seat occupant who sits on a conventional vehicle seat device, first, moves down and forward as if giving a large nod in order to resist the rearward force, and then, moves up and backward as if looking up from a face-down position in order to return the head to the original posture. It appears that the head therefore rotates about the pitch axis. Such shaking of the head about the pitch axis, in particular, movement of the head in the up/down direction, adversely affects the seat occupant's visibility of the front environment.

Figure 6:
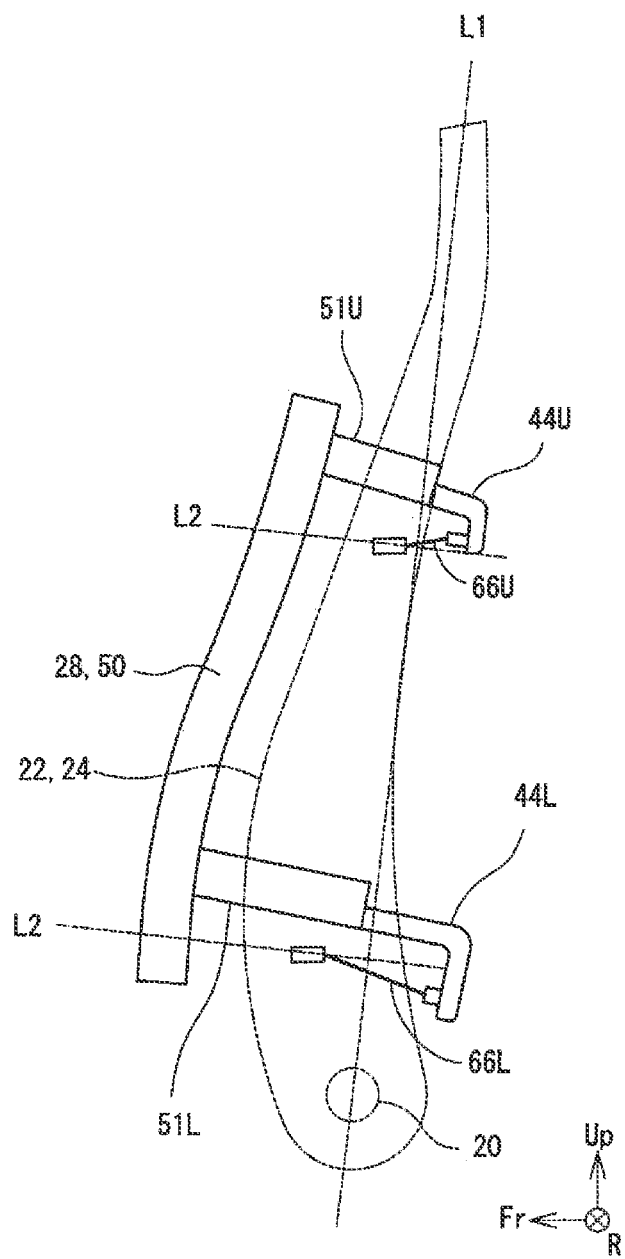
FIG. 6 is a schematic side view of the SB subframe and support wires.
Figure 7:
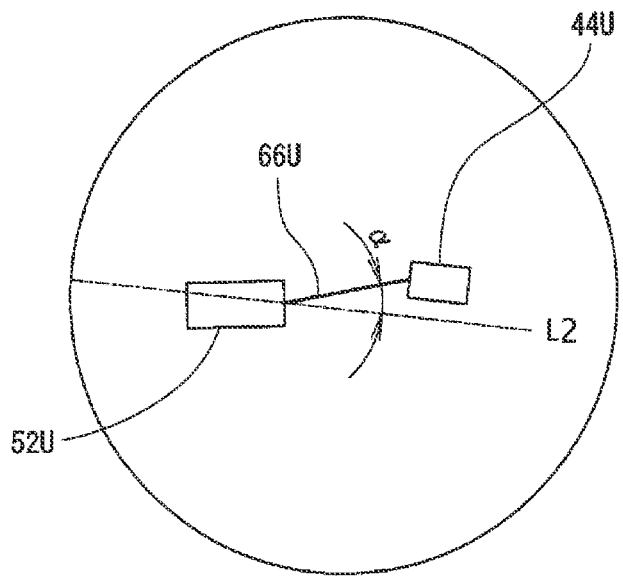
FIG. 7 is a schematic view of an upper support wire.

In consideration of the above, in order to reduce such shaking of the head about the pitch axis, in the illustrated embodiment, the lower support wires 66L are installed so as to rise toward the front. This configuration will be described below with reference to FIGS. 6 to 8. FIG. 6 is a schematic side view of the SB subframe 28 and the support wires 66. FIG. 7 is a schematic view of the upper support wire 66U, and FIG. 8 is a schematic view of the lower support wire 66L.

In the illustrated embodiment, a straight line connecting between an upper end of the SB main frame 22 and the reclining shaft 20 is set as a seat reference line L1, and a straight line perpendicular to the seat reference line L1 is set as a reference normal line L2. As illustrated in FIGS. 7 and 8, in the following description, an angle formed by the reference normal line L2 and the upper support wire 66U is referred to as "upper wire angle α", and an angle formed by the reference normal line L2 and the lower support wire 66L is referred to as "lower wire angle β".

Figure 8:
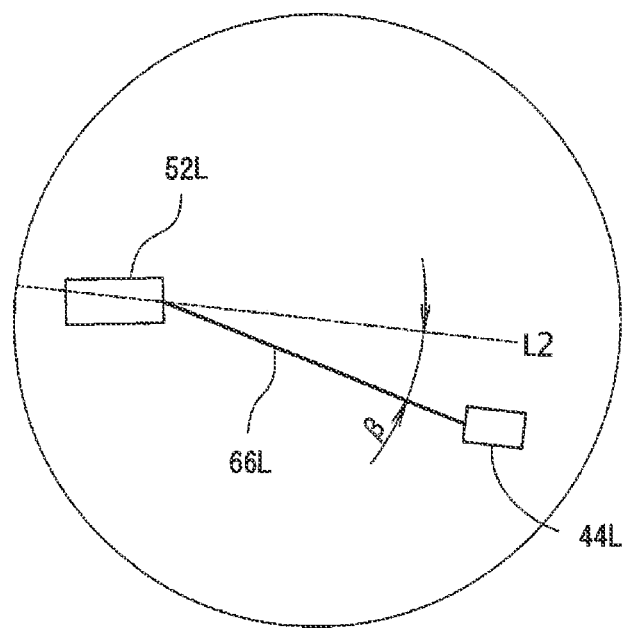
FIG. 8 is a schematic view of the lower support wire.

As illustrated in FIGS. 6 and 8, in the illustrated embodiment, the lower support wire 66L is installed so that the lower support wire 66L is inclined with respect to the reference normal line L2 so as to rise toward the front. This structure can suppress the seat occupant's shaking about the pitch axis, in particular, movement in the up/down direction. In response to a rearward force applied to the seat occupant and, in turn, the SB subframe 28, the SB subframe 28 moves rearward as far as allowed by tension in the support wires 66. After the SB subframe 28 moves rearward up until the position where the lower support wires 66L are fully stretched, a reaction force is applied from the SB subframe 28 to an area around the seat occupant's waist. This reaction force acts in the same direction as the inclined direction of the lower support wires 66L; that is, in a direction in which they rise toward the front. Receiving a forward and upward force at the waist causes the seat occupant's back to spontaneously bend backward; in this posture, the head resists moving down and forward. As such, movement of the seat occupant's head settles.

Figure 9:
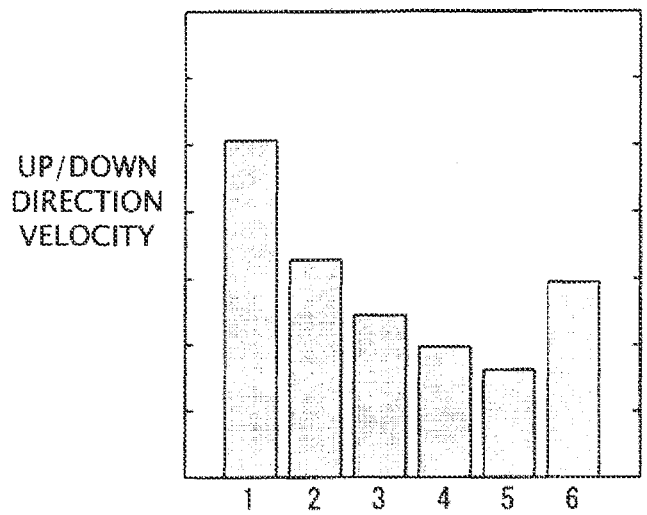
FIG. 9 is a graph that represents a velocity of movement of the head in the up/down direction as measured upon application to the vehicle seat device of vibration similar to that which occurs during off-road driving.
Figure 10:
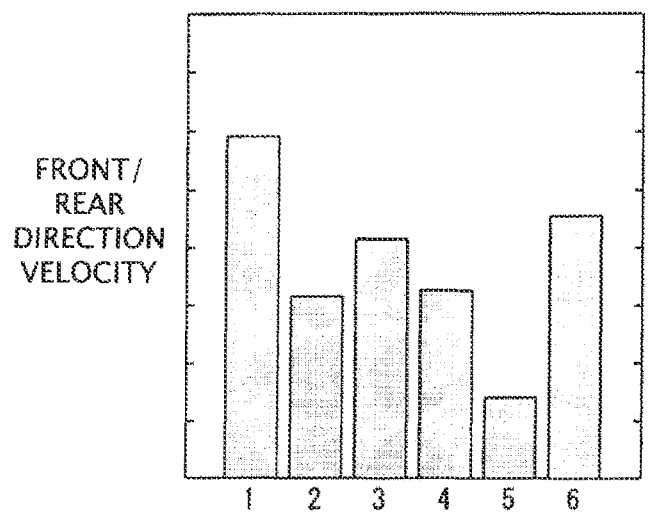
FIG. 10 is a graph that represents a velocity of movement of the head in the front/rear direction as measured upon application to the vehicle seat device of vibration similar to that which occurs during off-road driving.
Figure 11:
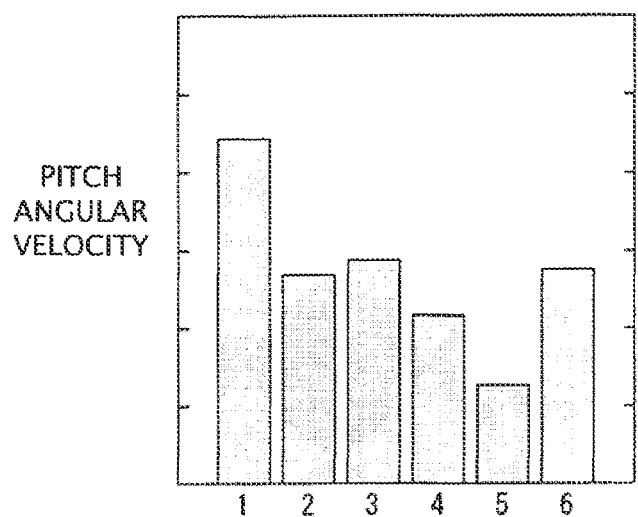
FIG. 11 is a graph that represents an angular velocity of the head about the pitch axis as measured upon application to the vehicle seat device of vibration similar to that which occurs during off-road driving.

FIGS. 9 to 11 are graphs that represent differences in movement of the head caused by differences in the lower wire angle β. More specifically, FIGS. 9 to 11 are graphs that represent measurement results of movement of the head as measured upon application to the vehicle seat device 10 of vibration similar to that which occurs during off-road driving. FIG. 9 represents a velocity of movement of the head in the up/down direction; FIG. 10 represents a velocity of movement of the head in the front/rear direction; and FIG. 11 represents an angular velocity of the head about the pitch axis. In FIGS. 9 to 11, values on the horizontal axis denote condition numbers; under Condition 1, the lower support wires 66L lower toward the front at the lower wire angle β of 30°, and under Condition 2, the lower wire angle β is 0°. Similarly, under Conditions 3, 4, 5, and 6, the lower support wires 66L rise toward the front at the lower wire angle β of 15°, 25°, 30°, and 35°, respectively. Under all of Conditions 1 through 6, the upper wire angle α is 0°.

Referring to FIG. 9, it can be seen that when the lower support wires 66L rise toward the front (under Conditions 3 to 6), movement of the head in the up/down direction is smaller than when the lower support wires 66L are parallel to the reference normal line L2 (under Condition 2). Referring to FIG. 10, it can be seen that when the lower support wires 66L rise toward the front at β=25° or β=30°, movement of the head in the front/rear direction is smaller than or substantially the same as when β=0°. Referring to FIG. 11, it can be seen that when the lower support wires 66L rise toward the front at β≥25° (under Conditions 4 to 6), the angular velocity of the head about the pitch axis is less than or substantially the same as when β=0°.

Typically, movement of the head in the up/down direction affects visibility of the front environment more significantly than movement of the head in the front/rear direction. As such, irrespective of an increase in movement of the head in the front/rear direction, impairment of visibility of the front environment can be effectively prevented when movement of the head in the up/down direction can be suppressed. As such, impairment of visibility of the front environment can be prevented by placing the lower support wires 66L so as to rise toward the front. Additionally, shaking of the head about the pitch axis can also be reduced by placing the lower support wires 66L so as to rise toward the front at the lower wire angle β of 25° or greater. A reduction in shaking about the pitch axis can ease the physical burden on the seat occupant and can increase the comfort thereof. Due to mechanical structural factors, it is difficult to set the lower wire angle β to be greater than 35°. As such, setting the lower wire angle β in a range of from 25° to 35° can effectively prevent impairment of visibility of the front environment and, additionally, can increase the comfort of the seat occupant.

With reference to FIGS. 6 and 7, the upper support wire 66U will next be described below. In the illustrated embodiment, the upper support wire 66U is inclined with respect to the reference normal line L2 so as to lower toward the front. This configuration is employed in order to reduce swinging of the seat occupant about the roll axis. When, as with the lower support wires 66L, the upper support wires 66U are placed so as to rise toward the front, while movement of the head in the up/down direction or about the pitch axis can be reduced, swinging of the head about the roll axis tends to increase. In the illustrated embodiment, for the purpose of reducing swinging about the roll axis as well, the upper support wires 66U are placed so as to lower toward the front. However, when greater importance is placed on reducing movement of the head in the up/down direction or about the pitch axis, the upper support wires 66U may also be placed so as to rise toward the front as with the lower support wires 66L, or may also be placed at α=0°.

Figure 12:
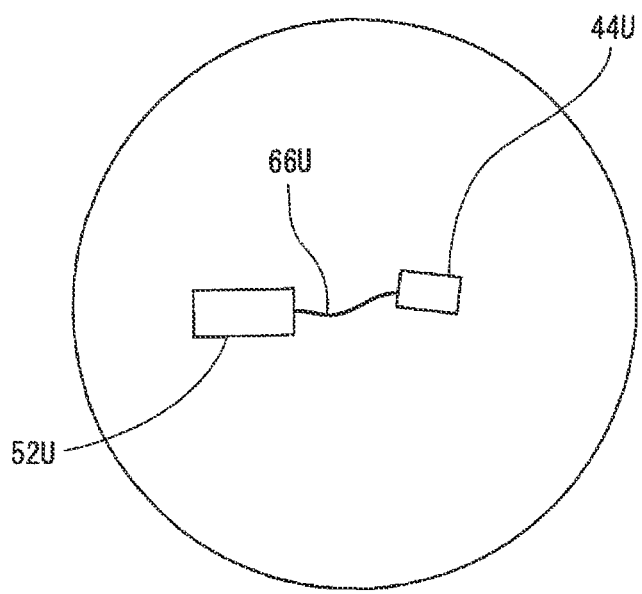
FIG. 12 is a schematic view illustrating the upper support wire that is disposed in a different manner.

As illustrated in FIG. 12, the upper support wires 66U may be loose with no load. In this embodiment, the upper support wires 66U exhibit no tension immediately after a rearward force is applied to the SB subframe 28 (in other words, in an initial phase). On the other hand, after the initial phase is over; that is, when the SB subframe 28 has moved rearward with respect to the SB main frame 22 up to a position where the slack is removed from the upper support wires 66U, the upper support wires 66U gradually increase their tension. In other words, when the upper support wires 66U are installed loosely, the upper support wires 66U serve as non-linear elastic bodies that change their tension non-linearly.

The upper support wires 66U, when configured as non-linear elastic bodies, can further reduce movement of the head in the up/down direction or about the pitch axis that occurs when a rearward force is applied. Although the exact principles behind why movement of the head can be reduced in this manner are unknown, the following inferences, for example, are possible. In the embodiment in which the upper support wires 66U are installed loosely, during the initial phase, a relatively large effect is produced by the lower support wires 66L that are disposed at an angle at which movement of the head is suppressed. It can be inferred that the upper support wires 66U configured as non-linear elastic bodies, therefore, can suppress movement of the head. Also, in the embodiment in which the upper support wires 66U are installed loosely, rearward movement of the waist that is located near the lower support wires 66L is limited even in the initial phase, whereas rearward movement of the chest that is located near the upper support wires 66U is allowed in the initial phase. It can also be inferred that, as the upper half of the seat occupant's body, therefore, bends backward more easily, downward and forward movement of the head is suppressed.

In either case, it can be clearly understood from the foregoing description that, in the illustrated embodiment, as the lower support wires 66L are inclined with respect to the reference normal line L2 so as to rise toward the front, movement of the head can be suppressed, and the seat occupant's visibility of the front environment as well as the comfort thereof can be enhanced.

Applicable placement angles of the support wires 66 vary depending on, for example, vehicle type. The support wires 66 may therefore be placed at angles that are changeable as appropriate. For example, the rear end of the support wire 66 may be attached to a rear fixing member 55 (see FIG. 5) that is detachably attachable to the rear restricting bracket 44, and the rear restricting bracket 44 may include a plurality of installation portions 45 for the rear fixing member 55. With this structure, the angle of inclination of the support wire 66 can be changed by changing the installation position of the rear fixing member 55 as necessary. Alternatively, rather than using the rear fixing member 55, the rear restricting bracket 44 may be configured to be attachable and replaceable as a whole, to and from the lateral frame 51.

Figure 13:
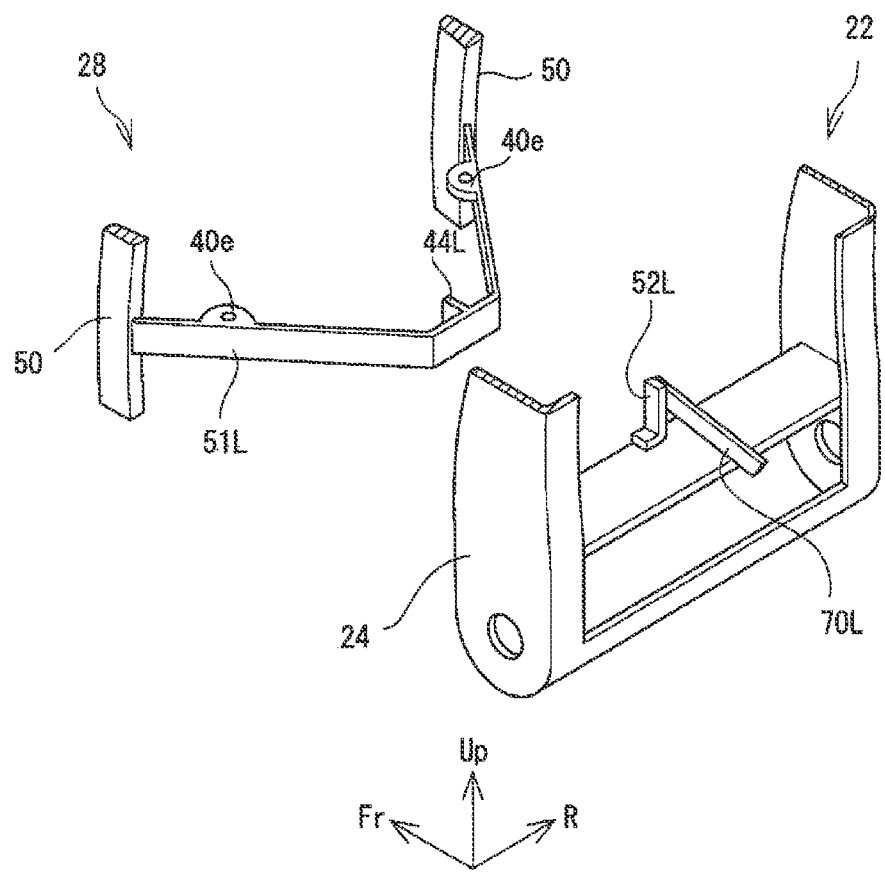
FIG. 13 is a perspective view of a structure around a lower support spring.
Figure 14:
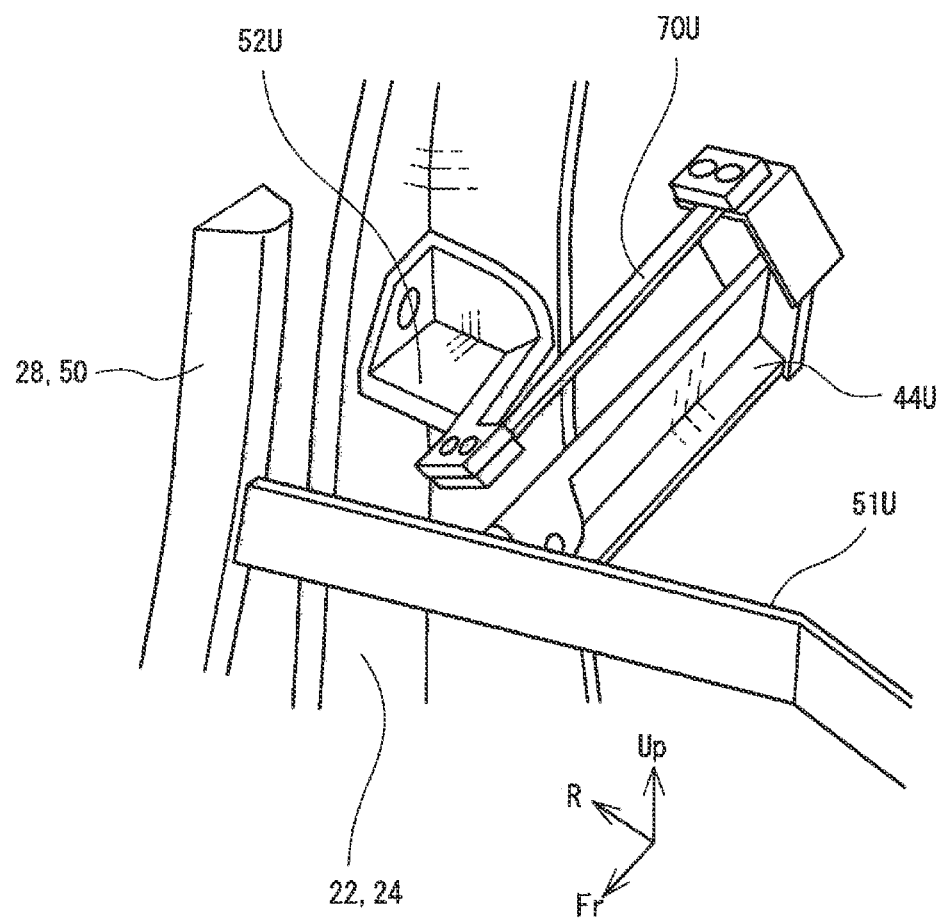
FIG. 14 is a perspective view of a structure around an upper support spring.

Although the foregoing description describes the support wires 66 as support members that limit rearward movement of the SB subframe 28, the support members may be any other structures that limit rearward movement of the SB subframe 28, and can allow swinging about the roll axis and, additionally, can change the joint-to-joint distance. For example, in place of the support wires 66, springs, such as plate springs, may be used. This configuration will be described below with reference to FIGS. 13 and 14. FIG. 13 is a perspective view of a structure around a lower support member, and FIG. 14 is a perspective view of a structure around an upper support member.

In the example illustrated in FIG. 13, a lower support spring 70L, which is a plate spring, is used as the lower support member. In FIG. 13, for example, only a single lower support spring 70L is disposed at the center of the SB main frame 22 in the right/left direction. The front end of the lower support spring 70L is joined to the SB main frame 22 via the lower front restricting bracket 52L. The rear end of the lower support spring 70L is joined to the SB subframe 28 via the lower rear restricting bracket 44L. The lower support spring 70L is inclined with respect to the reference normal line L2 so as to rise toward the front.

The lower support spring 70L is disposed to have its thickness direction parallel to the right/left direction. Deformation of the lower support spring 70L therefore allows swinging of the SB subframe 28 with respect to the SB main frame 22 in the right/left direction. Also, deformation of the lower support spring 70L changes the joint-to-joint distance of the lower support spring 70L.

In the embodiment in which a plate spring is used in place of wires as described above as well, as the plate spring (lower support spring 70L) is placed in the inclined posture so as to rise toward the front, a reaction force that rises toward the front is generated in response to a rearward force applied to the SB subframe 28. As such, movement of the seat occupant's head can be reduced.

Figure 15:
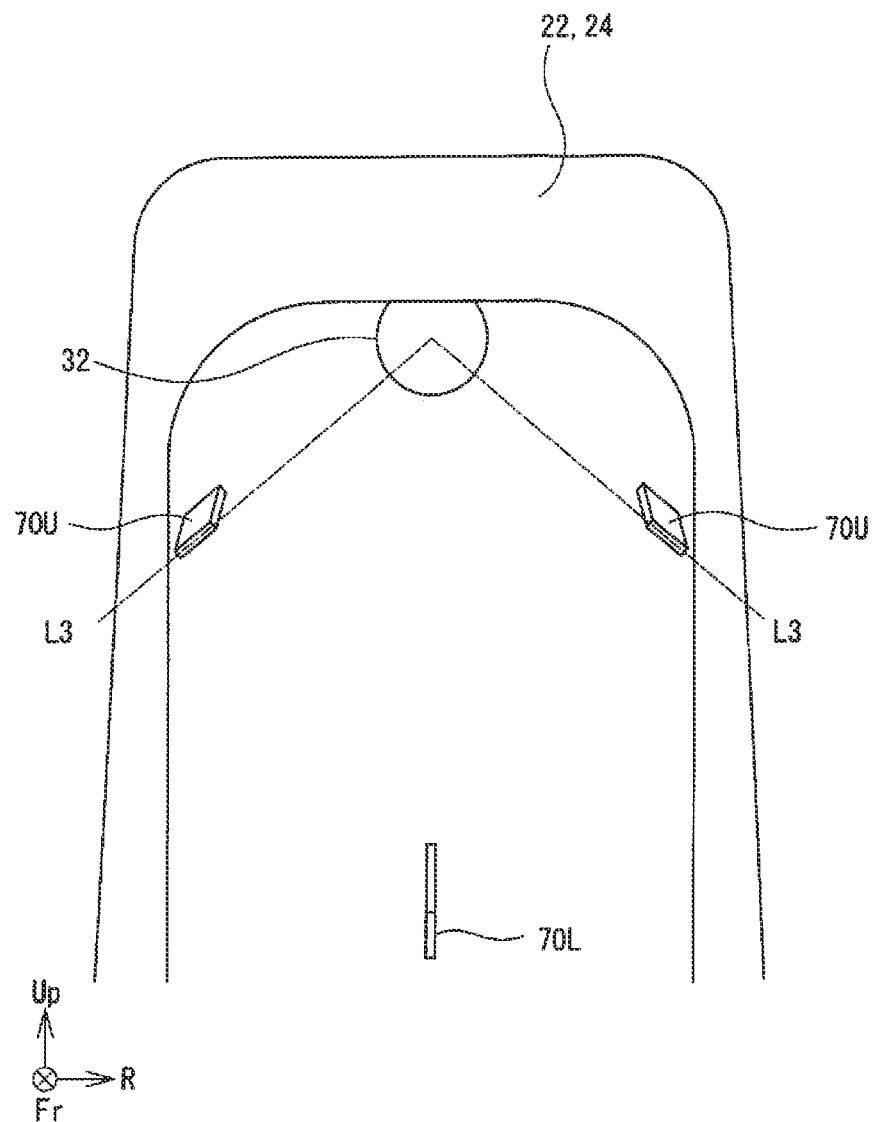
FIG. 15 is a schematic view of the vehicle seat device illustrated in FIGS. 13 and 14 as viewed from the rear side.

As illustrated in FIG. 14, an upper support spring 70U, which is a plate spring, may be used as the upper support member. In the illustrated embodiment, the front end of the upper support spring 70U is joined to the SB main frame 22 via the upper front restricting bracket 52U. The rear end of the upper support spring 70U is joined to the SB subframe 28 via the upper rear restricting bracket 44U. In the example illustrated in FIG. 14, the upper support spring 70U has its thickness direction inclined with respect to the right/left direction. Specifically, as illustrated in FIG. 15, the upper support springs 70U are disposed so that each has its width direction parallel to a straight line L3 connecting between the relay disk 32 and the upper support spring 70U. In FIGS. 14 and 15, for example, the upper support springs 70U are disposed so as to rise toward the front with respect to the reference normal line L2.

Figure 16:
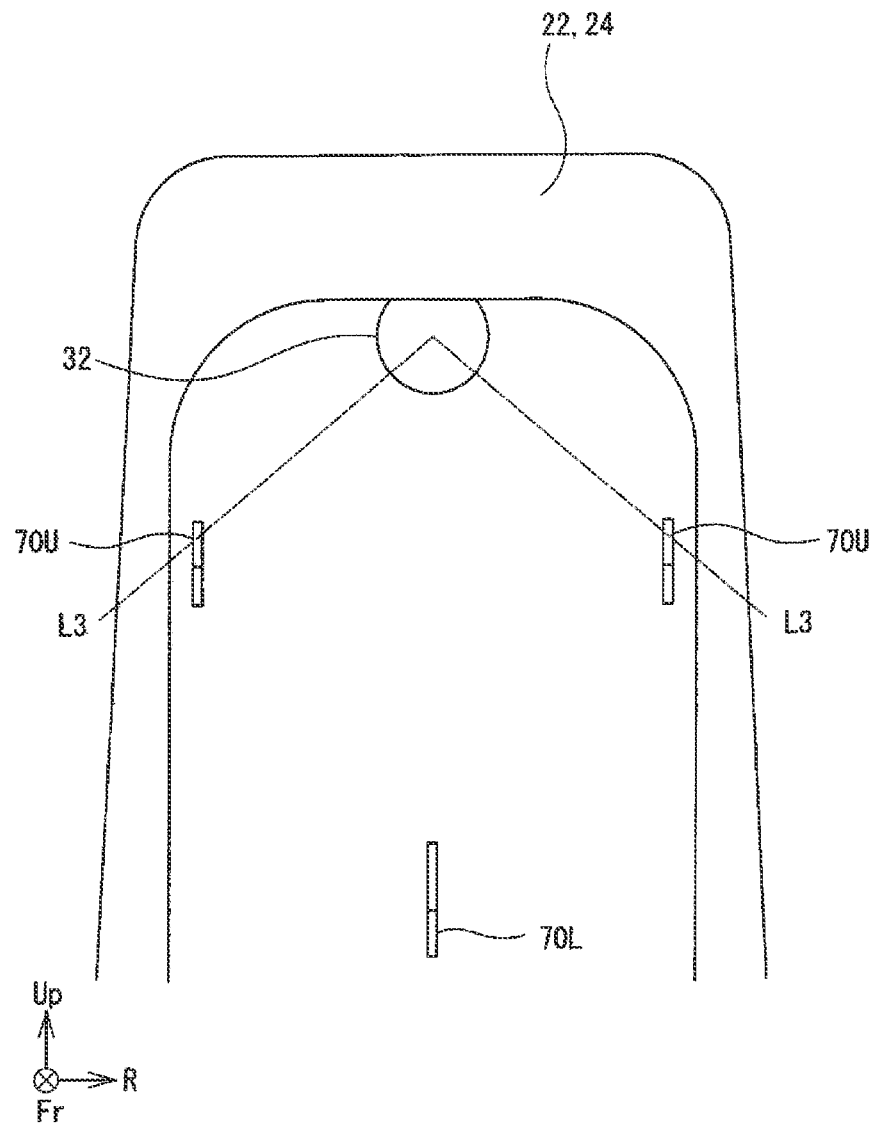
FIG. 16 is a schematic view of another vehicle seat device as viewed from the rear side.
Figure 17:
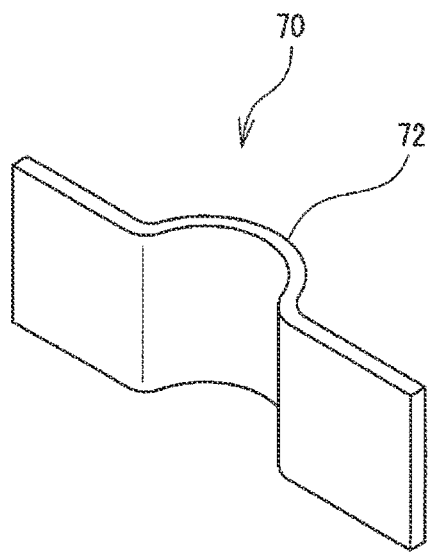
FIG. 17 is a schematic perspective view of a support spring.

However, the placement of the upper support springs 70U is disclosed herein by way of example and may be changed as appropriate. For example, as illustrated in FIG. 16, the upper support springs 70U may be disposed to each have its thickness direction parallel to the right/left direction and may be disposed so as to lower toward the front with respect to the reference normal line L2. In either case, deformation of the upper support springs 70U allows swinging of the SB subframe 28 about the roll axis and changes the joint-to-joint distance. To change the joint-to-joint distance of each of the support springs 70 more dynamically, as illustrated in FIG. 17, the support spring 70 may include somewhere in the middle thereof a curved portion 72 or a bent portion.

Figure 18:
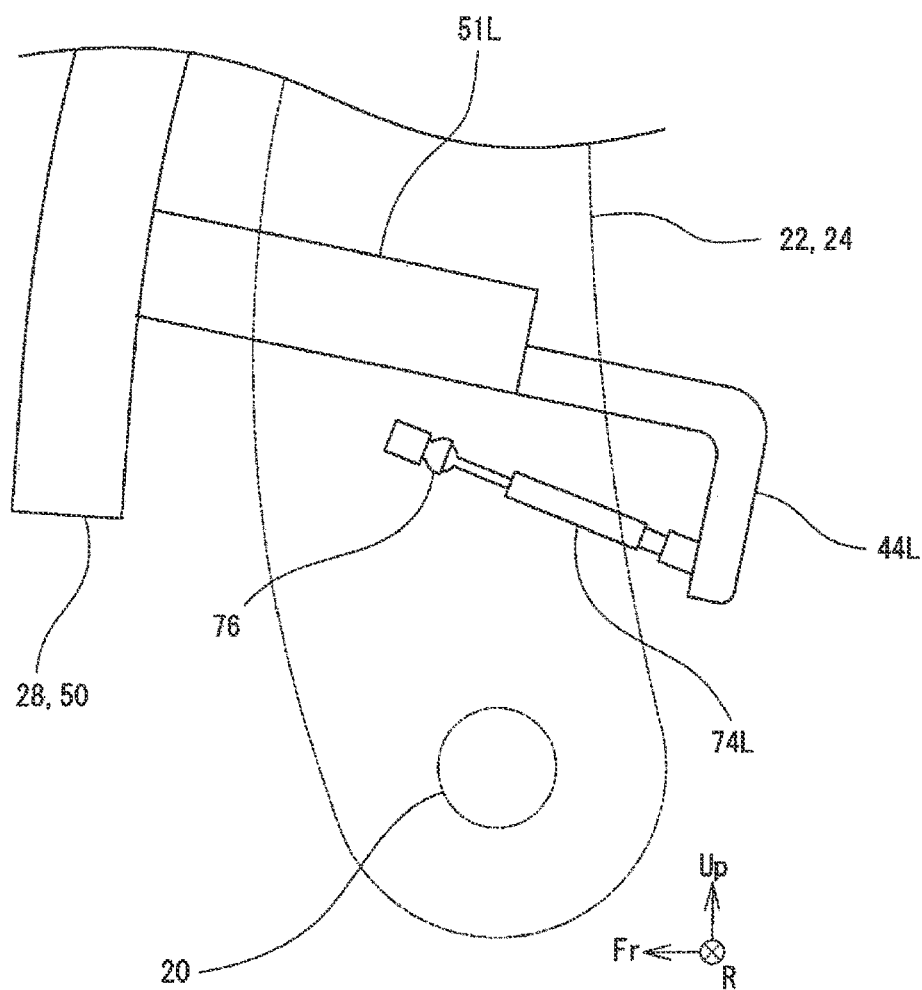
FIG. 18 illustrates a state in which a damper is used as a lower support member.

In another embodiment, a damper may be used as the support member. FIG. 18 illustrates a state in which a lower support damper 74L, which is a damper, is used as the lower support member. In this embodiment as well, as the lower support damper 74L is placed in the inclined posture with respect to the reference normal line L2 so as to rise toward the front, movement of the seat occupant's head can be reduced. In the embodiment in which the support damper 74 is used as the support member, in order to allow movement of the support damper 74 about the roll axis, the support damper 74 may have a universal joint, such as a ball joint 76, between the support damper 74 and either the SB subframe 28 or the SB main frame 22.

Although the foregoing description describes the SB subframe 28 that is held in a suspended manner, the SB subframe 28 may be held in any manner that allows swinging of the SB subframe 28 about the roll axis with respect to the SB main frame 22. For example, the SB subframe 28 may be swingably joined to the SB main frame 22 via rotary shafts or arc-shaped guide rails.

The invention claimed is:

1. A vehicle seat device comprising:
a seat back main frame that is in an upright position in a cabin, the seat back main frame being joined to a seat cushion via a reclining shaft;
a seat back subframe that is swingable with respect to the seat back main frame at least about a roll axis;

a backrest configured to support a back portion of a vehicle occupant, the backrest being installed on the seat back subframe and being swingable together with the seat back subframe; and a plurality of support members each having a front end joined to the seat back main frame and a rear end joined to the seat back subframe and having a variable joint-to-joint distance to limit rearward movement of the seat back subframe and allow movement of the seat back subframe about the roll axis, wherein the plurality of support members include a lower support member disposed in a lower half area of the seat back subframe and an upper support member disposed in an upper half area of the seat back subframe, and wherein a straight line connecting between the front end and the rear end of the lower support member is inclined with respect to a reference normal line so as to rise toward the front, the reference normal line being normal to a straight line connecting between an upper end of the seat back main frame and the reclining shaft.

2. The vehicle seat device according to claim 1, wherein a straight line connecting between the front end and the rear end of the upper support member is inclined with respect to the reference normal line so as to lower toward the front.

3. The vehicle seat device according to claim 1, wherein the upper support member is a non-linear elastic body, wherein the non-linear elastic body exhibits no tension in an initial phase after application of a rearward load that causes the seat back subframe to move rearward with respect to the seat back main frame, and wherein the non-linear elastic body increases tension after the initial phase is over.

4. The vehicle seat device according to claim 1, wherein the straight line connecting between the front end and the rear end of the lower support member is inclined with respect to the reference normal line at an angle of from 25 degrees to 35 degrees.

5. The vehicle seat device according to claim 1, wherein the upper support member and the lower support member are selected from the group consisting of elongated flexible members, springs, and dampers.

6. The vehicle seat device according to claim 1, further comprising:

a relay disk fixed to a rear side of the backrest; and a plurality of suspensions each strung between the relay disk and the seat back main frame, the plurality of suspensions being configured to hold the backrest in a suspended manner from the seat back main frame.

* * * * *